United States Patent [19]

Asano et al.

[11] Patent Number: 5,118,756

[45] Date of Patent: Jun. 2, 1992

[54] REACTION SYSTEM MODIFIER SUITABLE FOR USE IN THE PRODUCTIONS OF MICROCAPSULES

[75] Inventors: Makoto Asano, Yokohama; Kiyoharu Hasegawa, Kamakura; Yukio Tamura, Shibata; Yoshihiro Oono, Shiroishi, all of Japan

[73] Assignee: Mitsui Toatsu Chemicals, Inc., Tokyo, Japan

[21] Appl. No.: 646,454

[22] Filed: Jan. 25, 1991

Related U.S. Application Data

[60] Continuation of Ser. No. 782,468, Oct. 1, 1985, abandoned, which is a division of Ser. No. 633,960, Jul. 24, 1984, Pat. No. 4,574,110.

[30] Foreign Application Priority Data

Jul. 28, 1983 [JP] Japan ................. 58-136871
Apr. 11, 1984 [JP] Japan ................. 59-70959
Jun. 27, 1984 [JP] Japan ................. 59-130867

[51] Int. Cl.$^5$ .................. C08J 3/00; C08F 228/02
[52] U.S. Cl. ........................ 524/817; 526/287
[58] Field of Search ................ 526/287; 524/817

[56] References Cited

U.S. PATENT DOCUMENTS 4,221,710  9/1980  Hoshi et al. .
4,373,056  2/1983  Besecke ................. 524/547
4,406,816  9/1983  Sliwka ................... 521/69

Primary Examiner—Christopher Henderson
Attorney, Agent, or Firm—Fisher, Christen & Sabol

[57] ABSTRACT

When obtaining microcapsules by covering a hydrophobic material with an aminoaldehyde polycondensation product as a wall-forming material in an acidic aqueous medium containing an anionic water-soluble polymer, a microcapsule slurry having a high solid content and low viscosity can be obtained by using as the anionic water-soluble polymer a multi-component copolymer consisting as essential monomer components thereof of at least three types of acrylic monomers selected respectively from (A) acrylic acid and/or methacrylic acid, (B) acrylonitrile and/or methacrylonitrile and (C) an acrylamidoalkylsulfonic acid and/or sulfoalkyl acrylate. Over a wide pH range, the microcapsule slurry obtained in accordance with this invention undergoes little viscosity changes and exhibits neither destruction of its dispersed state nor coagulating tendency. Resulting microcapsules have a sharp particle size distribution and are equipped with dense wall films.

3 Claims, No Drawings

REACTION SYSTEM MODIFIER SUITABLE FOR USE IN THE PRODUCTIONS OF MICROCAPSULES

This application is a continuation of U.S. application Ser. No. 782,468, filed on Oct. 1, 1985, now abandoned, which is a division of U.S. application Ser. No. 633,960, filed on Jul. 24, 1984, now U.S. Pat. No. 4,574,110, issued on Mar. 4, 1986.

TECHNICAL FIELD

This invention relates to a production process of microcapsules, and more specifically to a production process of microcapsules having aminoaldehyde resin walls obtained in accordance with the in-situ polymerization process.

BACKGROUND ART

Microencapsulation has been studied in a wide variety of fields including recording materials such as pressure-sensitive recording papers, drugs, perfumes, agricultural chemicals, adhesives, foods, dyes, solvents, rust inhibitors, liquid crystals and health-promoting foods. Various microcapsules have already been put to practical use or are now under tests for their commercial applications.

A number of techniques has already been proposed especially on the microencapsulation of hydrophobic materials (both oily and solid materials). Among such techniques, the coacervation technique (phase separation technique) making use of gelatin is now applied on a commercial scale, principally, for pressure-sensitive copying paper.

However, microcapsules formed in accordance with the complex coacervation technique which uses gelatin and an anionic polyelectrolyte are accompanied inter alia by the following problems:

(1) Since the complex coacervation technique is difficult to provide on principle a microcapsule slurry having such a high solid concentration as 20% or more, resulting microcapsules require a high shipping cost and evaporation of a great deal of water is indispensable for their application in pressure-sensitive copying paper. There is still great room for improvement from the standpoint of working speed and energy cost.

(2) Microcapsules undergo large changes in both quality and price because their walls are made of natural materials.

(3) Microcapsules cannot be stored over prolonged periods since they are susceptible of putrefaction and coagulation.

Therefore, there has been a strong demand for the development of improved microcapsules in view of the quality and manufacturing cost of pressure-sensitive copying paper.

As improved techniques capable purportedly of satisfying such demands, there have been proposed in Japanese Patent Laid-open Nos. 9079/1976, 84881/1978, etc. production processes of high-concentration microcapsule slurries, each of which processes makes use of a urea-formaldehyde resin or melamine-formaldehyde resin obtained by the in-situ polymerization process as a film-forming material. Various improvements have also been proposed in addition to the above-mentioned processes.

In a process making use of a melamine-formaldehyde resin as a film-forming material, it is proposed for example in Japanese Patent Laid-open No. 84881/1978 to use, as an anionic polyelectrolyte, ethylene-maleic anhydride copolymer, methyl vinyl ether-maleic anhydride copolymer, propylene-maleic anhydride copolymer, butadiene-maleic anhydride copolymer, vinyl acetate-maleic anhydride copolymer and polyacrylic acid. These copolymers are however accompanied by such problems that they require high temperature and long time for their dissolution and due to high viscosity levels of resulting microcapsule slurries, they can hardly provide microcapsule slurries having high solid contents.

On the other hand, Japanese Patent Laid-open Nos. 49984/1979 and 47139/1980 disclose some examples of microencapsulation in a system of a styrene-maleic acid copolymer or in a system of a combination of a styrene-maleic acid copolymer and another maleic acid copolymer. However, styrene-maleic acid copolymer has poor solubility in water. Thus, its dissolution has to be effected at a high temperature for long time in the presence of an alkaline material. At a pH level of 4 or lower, the viscosity of the system is increased and its state of dispersion is destroyed due to deposition of the polymer. Therefore, it is difficult to remove formaldehyde at the acidic side. In addition, the above microencapsulation processes provide microcapsule slurries having relatively high viscosity levels.

Japanese Patent Laid-open No. 58536/1981 proposes to emulsify and disperse a core material, which is to be enclosed in microcapsules, in an aqueous solution of the homopolymer of a compound containing neither phenyl group nor sulfophenyl group but containing a sulfo group, specifically, sulfoethyl acrylate or methacrylate, sulfopropyl acrylate or methacrylate, maleinimido-N-ethanesulfonic acid or 2-acrylamido-2-methylpropanesulfonic acid, or a copolymer of such a compound and an alkyl acrylate, hydroxyalkyl acrylate or N-vinylpyrolidone; and then to add a melamine-formaldehyde pre-condensate in an amount conforming with the degree of condensation either contionously or little by little. The above-proposed microencapsulation process is however not preferred at all from the viewpoint of workability for the following reasons. Namely, the dispersion system remains unstable after the addition of the melamine-formaldehyde pre-condensate but before the formation of microcapsule walls where the core material is in an oily form. Thus, resulting oil droplets tend strongly to agglomerate into larger droplets unless the dispersion system is kept under very strong stirring conditions. Accordingly, it is difficult to control the diameters of emulsified droplets to desired sizes. Furthermore, the system may be gelated in its entirety or may develop coagulated particles of the melamine-formaldehyde pre-condensate unless the pre-condensate is charged little by little with special care over a long period of time. Moreover, this this microencapsulation process is incapable of providing any microcapsule slurry having a high solid content in excess of 50 wt. %.

It has also been proposed in Japanese Patent Laid-open No. 155636/1981 to form films as microcapsule walls by preparing an aqueous medium containing a polymer, which does not by itself have dispersion stability for a liquid material as a core material at acidic pH levels but owing to an interaction with a melamine-formaldehyde initial condensation product, does form a material capable of imparting dispersion stability of the liquid material, and the melamine-formaldehyde intial condensation product, adding the core material to form a stable dispersion after formation of the dispersion-stabilizing material, and then condensing the melamine-formaldehyde initial condensation product with an acid catalyst.

However, it is indispensable for the above microencapsulation process to cause the melamine-formaldehyde intial condensation product and the polymer to undergo partial condensation at a low temperature and for a long period of time prior to the incorporation of the core material in order to form the dispersion-stabilizing material for the core material. The core material is then emulsified and dispersed, and the system is thereafter heated to effect the condensation. Unless conditions for the partial condensation of the melamine-formaldehyde initial condensation product in the presence of the polymer are controlled precisely, the resulting emulsion will have such poor stability that the resulting microcapsules will have irregular sizes of the viscosity of the microcapsule slurry will tend to increase to a considerable extent. The above microencapsulation process involves another problem from the viewpoint of controlling the process steps. Furthermore, it cannot provide any microcapsule slurry having a solid content of 55 wt. % or higher.

On the other hand, use of urea-formaldehyde resin as a wall-forming material for microcapsules is disclosed as microencapsulation processes making use of hydrophobic materials obtained by the in-situ polymerization process in Japanese Patent Laid-open Nos. 9079/1976, 84882/1978, 84883/1978, 53679/1979, 85185/1979, 47139/1980, etc.

The production processes disclosed in the above publications are also accompanied with various problems. In Japanese Patent Laid-open No. 9079/1976, is disclosed a microencapsulation process for a hydrophobic material formed by condensation of urea and formaldehyde while using an ethylene-maleic anhydride copolymer, methyl vinyl ether-maleic anhydride copolymer or polyacrylic acid as an anionic water-soluble polymer. This process is however accompanied by such problems that it takes long time at a high temperature to dissolve such a polymer in water and the thus-prepared microcapsule slurry has an extremely high viscosity. On the other hand, Japanese Patent Laid-open No. 84883/1978 discloses to produce microcapsules by subjecting a urea-formaldehyde initial condensation product such as dimethylol urea, methylated dimethylol urea or the like to condensation in the presence of the above-mentioned water-soluble polymer. This microencapsulation process is however accompanied by the same drawbacks as that proposed in Japanese Patent Laid-open No. 9079/1976.

Reference may also be made to Japanese Patent Laid-open No. 53679/1979, in which there is proposed a process for producing microcapsules equipped with urea-formaldehyde resin walls in the presence of a styrene-maleic anhydride copolymer. Microcapsules are however caused to deposit at a low pH level of 4 or less when such a styrene-maleic anhydride copolymer is use. Therefore, this microencapsulation process is accompanied by such imminent drawbacks that it requires severe conditions for the production of microcapsules and the dissolution of such a polymer in water requires not only high temperature and long time but also an addition of an alkaline material.

In addition, Japanese Patent Laid-open No. 51238/1981 discloses use of a styrenesulfonic acid type polymer upon preparation of melamine-formaldehyde resin walls. When this process was applied to microcapsules having walls made of a urea-formaldehyde resin, it was difficult to obtain dense capsule walls and the whole system tended to coagulate or gelate by slight changes in conditions. Therefore, this process could not become a stable process for preparing microcapsules with good workability. On the other hand, Japanese Patent Laid-open No. 14942/1983 discloses to use a copolymerized anionic polymer consisting of three or more monomers including at least (A) acrylic acid, (B) a hydroxyalkyl acrylate or hydroxyalkyl methacrylate and (C) styrenesulfonic acid upon producing microcapsules having walls made of a melamine-aldehyde or urea-aldehyde polycondensation product in the presence of an anionic water-soluble polymer. However, it does not contain any disclosure about the preparation process of the copolymerized water-soluble polymer, and according to the reexamination of the present inventors, such copolymer caused gelation when polymerizing or did not undergo copolymerization to any sufficient extent and hence still contained unreacted monomers. Therefore, many of such copolymers were unsuitable for actual applications and were never satisfactory.

DISCLOSURE OF THE INVENTION

The first object of this invention is to provide a production process of microcapsules, which process is capable of providing a microcapsule slurry having a high solid content and low viscosity.

The second object of this invention is to provide a production process of microcapsules which have a sharp particle size distribution and are equipped with very dense walls made of an aminoaldehyde resin.

The third object of this invention is to provide a stable microcapsule slurry which over a wide pH range, undergoes small changes in viscosity and does not develop the tendency of dispersion destruction and of coagulation.

These objects can be achieved by forming microcapsules equipped with walls made of an aminoaldehyde resin in the presence of a multi-component copolymer containing as its essential monomer components at least three types of acrylic monomers, which are respectively at least one acrylic monomer selected from (A) acrylic acid and methacrylic acid, at least one acrylic monomer selected from (B) acrylonitrile and methacrylonitrile and at least one acrylic monomer selected from (C) acryloamidoalkylsulfonic acids and sulfoalkyl acrylates, or a salt of the copolymer as an anionic water-soluble polymer in a system in which a hydrophobic material (either oily or solid) has been emulsified and dispersed.

The process of this invention can provide microcapsules having walls made of an aminoaldehyde polycondensation product and excellent in denseness and flexibility. It also provides a microcapsule slurry having an ultra high solid content in excess of 60 wt. % of solid portions, which solid content has heretofore been never achieved despite of strong desire for it, and a low viscosity over a wide range of solid contents (up to 65 wt. % or higher). Resulting microcapsule slurries do not exhibit any coagulating tendency and have low and stable viscosity levels over a wide pH range, and show excellent heat-resistant stability.

Owing to the above-mentioned properties of microcapsule slurries obtained in accordance with the process of this invention, the present invention can bring about the following additional merits:

(1) A wide variety of treatment conditions may be readily adopted when removing formaldehyde from each slurry after production of microcapsules.

(2) Microcapsule slurries having such properties as described above may be prepared on industrial scales, because the volume efficiency of microcapsule production facilities can be improved to a significant extent and the production cost of microcapsules can be reduced considerably. Moreover, the production process enjoys far better workability compared with the various processes which have conventionally been proposed. In addition, the shipping cost can also be cut significantly.

(3) The present invention can also bring about a large merit from the viewpoint of utility of microcapsules. When the process of this invention is applied to prepare for example a microcapsule slurry containing as a core material a dyestuff applicable for copying or recording paper, the microcapsule slurry will be high in concentration but low in viscosity. It is therefore possible to coat a microcapsule slurry at a higher solid content compared with conventional microcapsule slurries. As a result, the energy required for the removal of water upon drying the thus-coated film will be lowered to a considerable extent, thereby permitting high-speed coating.

In addition, the viscosity of a microcapsule dispersion according to this invention will not vary even under mild alkaline conditions which the microcapsule dispersion will encounter when mixed with a binder or the like and applied on a base such as paper web or the like. Therefore, the efficiency of the coating work will be very good.

The microcapsule dispersion of this invention can be applied not only by a coating method, which has been extensively used to date and makes use of an air knife coater or bar coater, but also by a coating method which is suitable for applying a high-concentration coating formulation and makes use of a blade coater, gravure coater or the like. The present invention can also provide aqueous flexographic inks having high concentrations. Therefore, it can put wholly-printed or partially-printed CB-sheets to practical use in accordance with such printing techniques although such CB-sheets have heretofore been unavailable.

(4) Since each resulting microcapsule slurry is excellent in heat-resistant stability, it is possible to reduce the thermal energy required for the drying step, for example, spray-drying step of the microcapsule slurry to handle it as microcapsule powder and at the same time, to make such a drying operation efficient, coupled with such a conventionally-unavailable high concentration.

Best Mode for Carrying Out the Invention

The present invention provides a production process of microcapsules, which process comprises forming, around a hydrophobic material, wall films made substantially of an aminoaldehyde resin in the presence of an acidic aqueous solution of a multi-component copolymer containing as essential monomer components thereof at least three types of acrylic monomers selected respectively from (A) acrylic acid and/or methacrylic acid, (B) acrylonitrile and/or methacrylonitrile and (C) acrylamidoalkylsulfonic acids and/or sulfoalkyl acrylates or a salt of the copolymer.

According to the microcapsule production process of this invention, urea and formaldehyde, melamine and formaldehyde, a urea-formaldehyde initial condensation product or its modified product, a melamine-formaldehyde initial condensation product or its modified product, a urea-melamine-formaldehyde initial condensation product or its modified product, or the like are polycondensed around a hydrophobic core material in an acidic aqueous solution of the above-described anionic water-soluble polymer so that the core material is covered with dense films of an aminoaldehyde resin.

The anionic water-soluble polymer useful in the practice of this invention is an anionic water-soluble polymer of a multi-component polymer consisting of at least three vinyl monomer components, which are respectively at least one monomer selected from (A) acrylic acid and methacrylic acid, at least one monomer selected from (B) acrylonitrile and methacrylonitrile and at least one monomer selected from (C) acrylamidoalkylsulfonic acids and sulfoalkyl acrylates, or a salt of the multi-component polymer.

The acrylamidoalkylsulfonic acids (C) are compounds represented by the general formula (I):

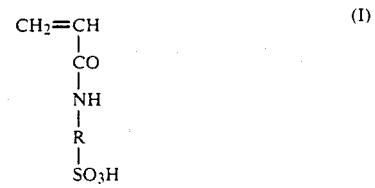

wherein R means alkylene groups. As specific examples of the acrylamidoalkylsulfonic acids (C), may be mentioned acrylamidomethanesulfonic acid, acrylamidoethanesulfonic acid, acrylamidopropanesulfonic acid, 2-acrylamido-2-methylpropanesulfonic acid, 2-acrylamido-n-butanesulfonic acid and so on.

On the other hand, the sulfoalkyl acrylates which also fall within the class (C) are compounds represented by the general formula (II):

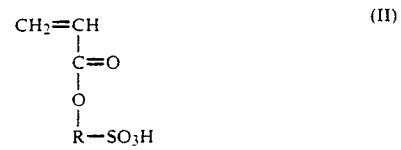

wherein R means alkylene groups. Illustrative of the sulfoalkyl acrylates are sulfomethyl acrylate, sulfoethyl acrylate, sulfopropyl acrylate, sulfobutyl acrylate, etc.

It may also be feasible to add, besides the above-mentioned three components, hydroxyethyl acrylate or methacrylate, hydroxypropyl acrylate, a lower alkyl acrylate, acrylamide, methacrylamide, methylolacrylamide, an N-alkyl substituted acrylamide and/or the like whenever necessary.

The proportions of the above-described three components may preferably range from 20–70 mole % for the component (A), from 20–70 mole % for the component (B) and 0.5–30 mole % for the component (C) respectively.

From the viewpoints of the availability of raw materials, the readiness of copolymerization and the effect as a special surfactant, it is preferred to employ a terpolymer consisting of 20–70 mole % of acrylic acid (A), 20–60 mole % of arylonitrile (B) and 0.5–30 mole % of 2-acrylamido-2-methylpropanesulfonic acid (C).

As a polymerization process for obtaining such a copolymer, may be mentioned the ionic polymerization, radical polymerization, thermal polymerization, radiation polymerization or the like. It is the radical polymerization that is preferred. Generally speaking, the radical polymerization is often practiced in a system in which the above-mentioned at least three types of monomers have been uniformly dissolved in water.

As exemplary polymerization catalysts, may be mentioned such radical polymerization initiators as various organic peroxides (e.g., benzoyl peroxide), organic hydroperoxides, aliphatic azobis compounds (e.g., azobisisobutyronitrile), and water-soluble peracid salts (e.g., persulfates). Since the anionic water-soluble polymer used in the present invention is preferred to have a relatively low molecular weight (i.e., that providing a low viscosity when formed into an aqueous solution), it is a radical-forming redox catalyst formed in combination of a water-soluble peracid (for example ammonium persulfate or potassium persulfate) and a water-soluble reducing agent (for example, a sulfite) that may be used most preferably. Such a radical-forming redox catalyst is generally added as an aqueous solution to the reaction system. The catalyst, namely, each of the water-soluble peracid and water-soluble reducing agent may be added in an amount of 0.01-10 parts per every 100 parts of the monomer components.

In order to control the molecular weight of a polymer to be obtained, the reaction may be carried out by incorporating a small amount of one of various compounds known as chain-transferring agents, for example, an alkylmercaptane or the like to the reaction system.

When polymerizing the vinyl monomers in the aqueous solution, monomers containing acidic groups may be subjected as free acids or partial or whole salts to the polymerization. When such monomers are used as salts, they may be used in the forms of alkali metal salts, alkaline earth metal salts, ammonium salts, lower amine salts, hydroxyalkylamine salts or the like.

Upon preparation of the anionic water-soluble polymer in an aqueous system in accordance with the radical polymerization process, the temperature of the system is adiabatically raised owing to abrupt generation of polymerization heat after the addition of the catalyst, and the polymerization reaction is hence brought to completion in a relatively short period of time. In view of the polymerization heat to be given off by the monomers, the polymerization reaction is generally effected using each monomer as a 5-30 wt. % aqueous solution in order to prevent the system from boiling.

The thus-obtained anionic water-soluble polymer has a molecular weight of 1,000-10,000,000 when measured by a gel permeation chromatograph (calibrated using dextran as a standard molecular weight). Owing to the limitation of the proportions of the three raw material components to the above-mentioned ranges, it remains soluble in water over a wide pH range. It is preferred to use such an anionic water-soluble polymer that its aqueous solution containing 20 wt. % of non-volatile components has a viscosity of 3-100,000 cps, or preferably 5-10,000 cps (when measured at 25° C. and pH 4.0 by a Brookfield viscosimeter). Any viscosity levels lower than 5 cps will result in microcapsules having a wide particle size distribution because corresponding anionic water-soluble polymers are somewhat insufficient in emulsifing capacity and emulsion stability. If the viscosity exceeds 10,000 cps, the viscosity of each resulting microcapsule slurry will be high and it will thus be difficult to prepare and handle microcapsules of high solid contents.

Such an anionic water-soluble polymer is generally handled as an aqueous solution from the polymerization stage of its constituent monomers. Accordingly, it may be used as a surfactant in the form of such an aqueous solution. In this case, it is unnecessary to dissolve the polymer again in water. It is thus very convenient to use the polymer as such an aqueous solution. Needless to say, it is also possible to use an anionic water-soluble polymer which has been obtained as dry powder.

The viscosity of an aqueous solution of the anionic water-soluble polymer, which is used in the present invention, varies extremely little in accordance with pH over a pH range of 2-14 without causing the polymer to deposit and hence turning the aqueous solution cloudy over the above-mentioned pH range. Therefore, neither the aqueous solution nor the resulting microcapsule slurry undergo such substantial changes that would lead to viscosity increment even when their pH levels are raised. Accordingly, the aqueous solution is easy to handle. The above-mentioned small tendency of viscosity increment by an increase in pH is extremely suitable from the viewpoint of the efficiency and readiness of its coating work too, because it is generally coated at the alkaline side on a base paper web when employed to produce pressure-sensitive copying paper, a suitable application field of microcapsules according to this invention.

In the microcapsule production process of this invention, an aminoaldehyde polycondensation resin is used as a material adapted to form wall films for enclosing a core material therein. Specific examples of such an aminoaldehyde polycondensation resin may include a urea-formaldehyde resin, melamine-formaldehyde resin, urea-melamine-formaldehyde resin and so on. As raw materials usable for the formation of such wall films, may be mentioned:

(A) urea and formaldehyde;

(B) a water-soluble urea-formaldehyde initial condensation product (for example, methylolurea, lower alkylated methylolurea, or a water-soluble low-degree condensation product thereof);

(C) a urea-formaldehyde initial condensation product modified by a phenol, melamine, benzoguanamine, sulfamic acid, an amine, a quaternary ammonium salt or the like;

(D) melamine and formaldehyde;

(E) a water-soluble melamine-formaldehyde initial condensation product (methylolmelamine, methylated methylolmelamine, butylated methylolmelamine or a low-degree condensation product thereof); and (F) a melamine-formaldehyde initial condensation product modified by a phenol, benzoguanamine, sulfamic acid, an amine, urea, a quaternary ammonium salt or the like.

It may also be possible to use, with a view toward controlling the denseness and rigidity of the wall films of microcapsules, one or more of various aromatic polyhyroxy compounds and their derivatives in a total amount of 1-30 parts based on every 100 parts of urea or the urea-formaldehyde initial condensation product. As examples of such compounds, may be mentioned resorcin, orcine, meta-methoxyphenol, pyrogallol, etc. with resorcin being a preferred compound for its ready availability.

Such an aromatic polyhydroxy compound is generally used by mixing and dissolving it together with urea or the urea-formaldehyde initial condensation product in the aqueous solution of the anionic polymer prior to the dispersion and emulsification of the core material.

In view of the denseness of resulting films and the readiness of reaction operation, it is most preferred to form microcapsules of a water-soluble melamine-formaldehyde initial condensation product, notably a water-soluble methylated methylolmelamine or its aqueous solution among microcapsules equipped with walls made of the above-mentioned aminoaldehyde resins.

The amount of the anionic water-soluble polymer to be used in accordance with this invention may vary depending on the type of the water-soluble polymer, the types of starting materials to be used for the formation of microcapsules, the type of a core material to be encapsulated, conditions employed for the production of microcapsules, etc. It may however be 0.5–10 wt. %, or preferably 1–5 wt. % of the microcapsule-producing system. In addition to the anionic water-soluble polymer of this invention, it may also be possible to use other aninoic water-soluble polymers, for example, ethylene-maleic anhydride copolymer, methyl vinyl ether-maleic anhydride copolymer, polyacrylic acid, vinyl acetate-maleic anhydride copolymer, styrenesulfonic acid polymer or copolymers, anion-modified povals, gum arabi, cellulose derivatives and the like in suitable combination as needed.

The ratio of the wall-forming material to core material to be used in the process of this invention may generally range from 1:3 to 1:20 (wt./wt.). This ratio may however vary depending on the type of a material to be used as the core material or the end use of the resulting microcapsules.

The microcapsule core material useful in the process of this invention is a water-immiscible liquid or a solid. Hydrophobic liquids may be mentioned as suitable core materials. Specific examples of such hydrophobic liquids may be partially-hyrogenated terphenyl, chlorinated paraffin, diallylalkanes, alkylnaphthalenes, dibenzylbenzene derivatives, alkylbenzenes, paraffin, cycloparaffin, various esters, for example, esters of phthalic acid, adipic acid, citric acid, myristic acid, trimellitic acid, sebacic acid, stearic acid, benzoic acid, phosphoric acid and the like, nitrogen-containing compounds, e.g., nitrobenzene, dimethylaniline, dimethyl-p-toluidine, various perfumes, liquid crystal compounds, and so on. It is also possible to use, as a core material, a hydrophobic aqueous liquid obtained by dissolving a water-insoluble solid material.

A microcapsule slurry suitable for pressure-sensitive copying paper may be produced by applying the process of this invention. For such microcapsules, there may be used as a core material a solution obtained by dissolving a dyestuff precursor such as a phthalide derivative, fluoran derivative, acylleucophenothiazine derivative, leucotriarylmethane derivative, leucoindolylmethane derivative, spiropyran derivative or phthalimidin derivative in a hydrophobic high b.p. solvent such as an alkylnaphthalene, diallylalkane, partially-hydrogenated terphenyl or the like.

The process of this invention may, roughly speaking, be carried out through the following steps:

(1) Preparation of an aqueous solution of an anionic water-soluble polymer;

(2) Emulsification or dispersion of a core material in the aqueous solution of the anionic water-soluble polymer;

(3) Subsequent addition of a material adapted to form (4) pH-Adjusting step (optional);

(5) Encapsulation step by the formation of films of the aminoaldehyde resin; and (6) Treatment step for any remaining formaldehyde (optional).

The above process steps may of course be carried out in a different order whenever needed.

The aqueous solution of the anionic water-soluble polymer, which solution is useful in the process of this invention, has extremely good workability, because it can provide a stable emulsion or dispersion for a core material over a wide pH and temperature ranges and even when a melamine-formaldehyde film forming material is incorporated, it does not tend to show temporary viscosity increment or to permit growth of giant droplets or particles due to agglomeration or coagulation of droplets or particles of the core material.

The emulsification or dispersion of the core material is effected using a homomixer, homogenizer, flow jet mixer, static mixer, in-line mixer or the like. The suitable droplet size of the core material in such an emulsion or dispersion may vary depending what end use will be made on the resulting microcapsules. However, the average droplet size may be about 2–10 micrometers or so when the resulting microcapsules are used for example in pressure-sensitive copying paper. Inclusion of many coarse droplets exceeding 15 micrometers is not preferred as they will cause background smudge even under mild pressures.

The microcapsule wall forming reaction may generally be carried out at 40°–80° C. or preferably 50°–60° C. and at a pH level in the range of 2.5–6.5 or preferably 4.0–5.5.

The reaction, in which wall films are formed with an aminoaldehyde resin, may generally be accelerated at higher temperatures when the pH level remains low. In a pH range lower than 2.5, each microcapsule slurry undergoes considerable coloration due to development of the color of the dyestuff precursor under such acidic conditions. Accordingly, such a low pH range is not suited for the production of pressure-sensitive copying paper. If pH should exceed 6.5 on the other hand, the wall film forming reaction will be unduly slow and the encapsulation will require a high temperature and long time period. Therefore, such a high pH range is inconvenient. Generally speaking, the reaction can be brought to completion in several hours under such reaction conditions as 50°–100° C. and pH 3.0–5.5.

It may also be possible, whenever necessary, to improve the denseness and anti-solvent stability of films to significant extents by carrying out the polycondensation reaction stepwise at two or more different pH and temperature levels and hence increasing the degree of cross-linking of the resulting aminoaldehyde resin still further.

In addition, no problem or inconvenience will be encountered at all when the ammonium salt (for example, ammonium chloride) of an acid or the like is used as a reaction accelerator. When it is necessary for sanitary reasons to remove or decrease still-remaining free formaldehyde after the formation of the wall films of microcapsules, the remaining formaldehyde may be removed by converting it into a harmless form under suitable conditions with urea, ethyleneurea, a sulfite, a sugar, ammonia, an amine, a hydroxyamine salt (hydrochloric acid salt, sulfuric acid salt, or phosphoric acid salt), melamine, a compound containing an active methylene group, an hydroxyalkylamine, an acrylamide-base polymer or the like.

The microcapsule production process of this invention will hereinafter be described in detail in the following Examples and Comparative Examples.

EXAMPLE 1

In a nitrogen atmosphere, 0.08 mole (16.58 parts) of 2-acrylamido-2-methylpropanesulfonic acid was dissolved in 313 parts of deionized water, and the pH of the resultant solution was then adjusted to 7.5 with a 20% aqueous solution of sodium hydroxide. Thereafter, 0.58 mole (42.64 parts) of 98% acrylic acid and 0.36 mole (19.10 parts) of acrylonitrile were added. The thus-obtained mixture was stirred and mixed into a homogeneous aqueous solution.

After heating the system to 30° C. and holding its temperature there, 40 parts of a 20% aqueous solution of ammonium persulfate were added and 5 minutes later, 16 parts of a 20% aqueous solution of sodium hydrogensulfite were added further. Then, the polymerization was caused to start in an adiabatic state. The temperature of the system arose to 75° C. in 30 minutes owing to polymerization heat. After holding the system at 75° C. for 1 hour, the system was cooled and its pH was adjusted to 4.0 with a 20% aqueous solution of sodium hydroxide, thereby obtaining a 20% aqueous solution (A) of an anionic water-soluble polymer. The aqueous solution had a viscosity of 190 cps at 25° C.

Microencapsulation was conducted in the following manner, using the above-prepared aqueous solution (A) Added to an aqueous solution (pH 4.0) obtained by diluting 30 parts of the aqueous solution (A) to 92.4 parts with water was, as a core material, 130 parts of alkylnaphthalenes ("KMC-113", product of Kureha Chemical Industry Co., Ltd.) containing 3.0 wt. % of Crystal Violet Lactone and 0.8 wt. % of Benzoyl Leuco Methylene Blue, both dissolved in the alkylnaphthalenes. The resulting mixture was then mixed and emulsified at 11,000 rpm with a Homo-Mixer (a trademark; manufactured by Tokushu Kika K.K.). Ten minutes later, an o/w-type stable emulsion having an average droplet size of 3.5 micrometers was obtained, to which 24.4 parts an aqueous solution of a methylated methylolmelamine resin (non-volatile components: 80 wt. %; "U-Ramin T-34"; product of Mitsui-Toatsu Chemicals, Inc.) were added with stirring. Then, the system was heated to 60° C. at which the reactants were condensed for 2 hours. The reaction mixture was then cooled to complete the microencapsulation.

The resultant microcapsule slurry had a very high solid content of 63 wt. % and its viscosity was 320 cps at 25° C.

In order to remove still-remaining formaldehyde, a 28% aqueous ammonia solution was added to raise the pH of the microcapsule slurry to 8.5. The microcapsule slurry was thus rendered free of formalin smell, thereby obtaining a good microcapsule slurry having no coagulating tendency and a viscosity of 290 cps.

The average particle size of resultant microcapsules was 3.6 micrometers. There was no coarse particle exceeding 10 micrometers.

EXAMPLE 2

The microcapsule slurry obtained in Example 1 was diluted with water to investigate the relationship between its solid portion and viscosity. Viscosities were each measured using a Brookfield viscosimeter at 25° C.

| Concentration of solid portions | 63% | 60% | 50% | 40% | 30% |
|---|---|---|---|---|---|
| Viscosity (cps) | 320 | 100 | 23 | 9 | 3 |

EXAMPLE 3

36 parts of the 20% aqueous solution (A) of the anionic water-soluble polymer prepared in Example 1 was diluted with 84 parts of water, the pH of the diluted solution was adjusted to 4.1, followed by an addition of 36 parts of an aqueous solution of a methylated methylolmelamine (non-volatile components: 80%). The resulting mixture was stirred to prepare a homogeneous aqueous solution, to which were added 144 parts of phenylxylylethane (product of Nippon Petrochemical Co., Ltd.; "Hisol SAS-296") which contained 4.0 wt. % of 3-diethylamino-6-methyl-7-anilinofluoran and 0.5 wt. % of Crystal Violet Lactone, both dissolved in the phenylxylylethane. The resultant mixture was emulsified at 11,000 rpm with a Homo-Mixer, thereby obtaining a stable o/w-type emulsion having an average droplet size of 3.5 micrometer in 3 minutes. The emulsion had a low viscosity and very good emulsion stability.

The above steps were conducted while maintaining the system at 25° C.

Thereafter, the homomixer was removed, and the thus-prepared system was heated gradually to 70° C. while stirring it gently. At 70° C., the formation of capsule walls was effected for 1 hour. Then, 50% acetic acid was added to adjust its pH to 4.5. The reaction was allowed to proceed for further one hour. The system was then cooled to complete the microencapsulation. The resulting microcapsule slurry had a high solid content of 60 wt. % and a low viscosity of 90 cps. One hundred parts of the thus-obtained microcapsule slurry were separated, to which urea was added in an amount one tenth that of the above-used methylated methylolmelamine. The pH of the resulting mixture was adjusted to 3.0 with acetic acid, followed by its heating. The mixture was reacted at 70° C. for 1 hour and the remaining formaldehyde was removed. Finally, the pH of the thus-prepared mixture was raised to 9.5 with a 20% aqueous solution of sodium hydroxide to obtain a microcapsule slurry free of the formalin smell. No tendency of viscosity increment or coagulation was observed at all in the formalin-removing step.

EXAMPLE 4

Following the preparation procedures of the anionic water-soluble polymer in Example 1, there was obtained a 20% aqueous solution (B) of an anionic water-soluble polymer having such monomer proportions of 60 mole % acrylic acid, 30 mole % acrylonitrile and 10 mole % 2-acrylamido-2-methylpropanesulfonic acid. The aqueous solution had a viscosity of 130 cps at 25° C.

Then, a solution was prepared from a mixture consisting of 50 parts of the above aqueous solution and 156 parts of water, to which a 20% aqueous solution of sodium hydroxide was added to raise the pH of the solution to 4.5. Two hundred grams of the same core material as that used in Example 1 were added to the resultant solution. The thus-obtained mixture was emulsified for 15 minutes with a Homo-Mixer to obtain a stable o/w-type emulsion having an average droplet size of 2.8 micrometers. Added then to the above-prepared emulsion was an aqueous solution of a melamine resin precursor, which solution had in advance been prepared by heating and dissolving a mixture of 26.5 parts of 37% formaldehyde and 20 parts of melamine. The resulting mixture was caused to react with stirring at 60° C. for 3 hours to finish the microencapsulation. The thus-obtained microcapsule slurry had a solid content of 53 wt. % and its viscosity was 42 cps (at 25° C.).

EXAMPLE 5

Following the procedures of Example 1. a 20% aqueous solution (C) of an anionic water-soluble polymer having a monomer composition of 15 mole % sulfopropyl acrylate, 50 mole % of methacrylic acid and 35 mole % of acrylonitrile was obtained from methacrylic acid, acrylonitrile and a 50% aqueous solution of sulfopropyl acrylate. The aqueous solution (C) had a pH of 4.0 and at 25° C., a viscosity of 240 cps.

Then, 50 parts of a 20% aqueous solution of the copolymer were stirred and mixed with 162 parts of water, and were adjusted its pH to 4.3, to which, as a core material, 260 parts of partially-hydrogenated terphenyl ("HB-40"; product of Monsanto) containing 3.5 wt. % of Crystal Violet Lactone dissolved therein were added. The resultant mixture was emulsified for 20 minutes with a Homo-Mixer to obtain an o/w-type emulsion having an average droplet size of 4.2 micrometers. Then, 208 parts of an aqueous solution of methylated methylolmelamine ("U-Ramin P-6100"; product of Mitsui-Toatsu Chemiclas, Inc.) were added to the above-obtained emulsion. The temperature of the system was raised to 55° C., at which the reactants were subjected to condensation for 3 hours. Then, a small amount of 50% acetic acid was added and the condensation was allowed to proceed continuously for further 2 hours to bring the microencapsulation to completion.

The thus-prepared microcapsule slurry had a solid content of 55 wt. % and its viscosity was as low as 75 cps at 25° C.

COMPARATIVE EXAMPLE 1

Fifty parts of an ethylene-maleic anhydride copolymer were dissolved under heat in 450 parts of water to obtain a 10% aqueous solution (D). Then, 100 parts of the aqueous solution (D) and 200 parts of water were mixed together, and the pH of the resultant mixture was raised to 4.0 with a 10% aqueous solution of sodium hydroxide. With a Homo-Mixer, 200 parts of the same core material as that used in Example 1 were emulsified in the above-prepared mixture to obtain a stable o/w-type emulsion.

Added further with stirring to the above emulsion were 60 parts of methylated methylolmelamine having a solid content of 50% (product of Mitsui-Toatsu Chemicals, Inc.; "U-Ramin T-530"). The resultant mixture was then stirred for 2 hours while maintaining it at 55° C., thereby completing the microencapsulation.

The thus-obtained microcapsule slurry had a solid of 42.9 wt. %. However, the viscosity of the system increased abruptly as wall films were formed by condensation of the melamine-formaldehyde initial condensation product. A microcapsule slurry obtained by cooling the reaction mixture after formation of films did not show any significant coagulating tendency. but had a high viscosity of 7,400 cps and lost its fluidity almost completely.

COMPARATIVE EXAMPLE 2

Microencapsulation was completed in much the same way as in Comparative Example 1. except that the amount of water was adjusted to make the solid content of the resulting microcapsule slurry be 35 wt. %. After cooling, the resultant microcapsule slurry had a pH of 4.8 and a viscosity of 250 cps.

In order to remove the remaining formalin, a 28% aqueous ammonia solution was added to adjust the pH of the microcapsule slurry to 8.5. The smell of formaldehyde was completely wiped off, but the viscosity of the resultant microcapsule slurry increased to a value of 670 cps. Therefore, it was recognized that the viscosity was dependent heavily on the pH. It was hence necessary to pay special attention to the control of pH level while the microcapsule slurry was coated.

COMPARATIVE EXAMPLE 3

There were used 2.5 parts of a styrene-maleic anhydride copolymer (product of Monsanto; "Scripset-520"), 2.5 parts of a vinyl acetate-maleic anhydride copolymer [product of Nihon Nyukazai K.K.; "Disrol H-12 (un-neutralized)"] and a dilute aqueous solution of sodium hydroxide. The copolymers were dissolved in water under heat while controlling the pH of the resulting solution at 5.0, thereby to obtain 100 parts of an aqueous solution. It took 4 hours at 90° C. until the copolymers were dissolved completely. Thereafter, microencapsulation was effected in a constant-temperature water tank of 55° C.

To a mixture of 100 parts of the aqueous solution of the styrene-maleic anhydride copolymer and vinyl acetate-maleic anhydride copolymer and 17.5 parts of water, 100 parts of the same core material as that used in Example 1 were emulsified or dispersed with a Homo-Mixer, followed by an addition of 12.5 parts of an 80% aqueous solution of methylated methylolmelamine (product of Mitsui-Toatsu Chemicals, Inc.; "U-Ramin T-33"). The resultant mixture was subjected to condensation for 2 hours and was then cooled to complete the formation of microcapsule films. The thus-obtained microcapsule slurry had a solid content of 50 wt. % and a viscosity of 620 cps.

In order to remove remaining formalin, the slurry was heated again to 60° C. at which 3 parts of a 40% aqueous urea solution were added. The pH of the slurry was thereafter adjusted to 4.0. Here, the slurry became viscous in its entirety and no further stirring was feasible. Accordingly, it was impossible to remove the remaining formaldehyde at the acidic side for example by an addition of urea.

COMPARATIVE EXAMPLE 4

Forty parts of 2-acrylamido-2-methylpropanesulfonic acid were dissolved with stirring in 160 parts of water, followed by its adjustment to pH 5.0 with a 20% aqueous solution of sodium hydroxide. Then, 3.7 parts of a 10% aqueous solution of ammonium persulfate and 0.8 part of a 10% solution of sodium hydrogensulfite were added. The resulting mixture was adiabatically polymerized to obtain a 20 wt. % aqueous solution (D) of sodium poly(2-acrylamido-2-methylpropanesulfonate).

The viscosity of the aqueous solution (D) was 430 cps at 25° C.

(4-1) Microencapsulation

Mixed with stirring were 25 parts of the aqueous solution (D) and 85 parts of water. The pH of the resulting mixture was adjusted to 4.0. One hundred parts of the same core material as that employed in Example 1 were added to the above-prepared system. The resulting mixture was emulsified or dispersed at 60° C. for 20 minutes with a Homo-Mixer. The resultant o/w-type emulsion had poor emulsion stability and agglomeration of oil droplets took place immediately upon stoppage of the stirring. It was thus necessary to apply strong shear forces always to the emulsion in order to keep its oil droplets in small sizes. Hence, it was very difficult to control the sizes of the emulsified droplets. When 30 parts of a 50% aqueous solution of methylated methylolmelamine (product of Mitsui-Toatsu Chemicals, Inc.; "U-Ramin P-6100") were added with vigorous agitation, the system became very viscous abruptly and 5 minutes later, the system was coagulated and gelated in its entirety.

(4-2)

The procedures of the above microencapsulation (4-1) were followed, except that the methylated methylolmelamine ("Euramine P-6100") was carefully dropped with vigorous agitation in the course of 2 hours so as to avoid the gelation of the system and the reaction was then allowed to proceed for further 2 hours to complete the microencapsulation. Due to poor emulsion stability to oil, many coarse droplets and coagulated droplets were observed in the thus-prepared microcapsule slurry. The microcapsule slurry was inconvenient for use in the production of pressure-sensitive copying paper unless such coarse droplets and coagulated droplets were filtered off through a sieve.

By the way, the average droplet size was 7.4 micrometers. The solid content and viscosity of the slurry were 50 wt. % and 350 cps respectively.

COMPARATIVE EXAMPLE 5

After dissolving 8.4 parts of sodium styrenesulfonate (product of Toyo Soda Mfg., Co., Ltd.; "Spinomer SS"; purity: 85%) in 161.3 parts of water, were added 29.9 parts of 98% acrylic acid and 6.5 parts of hydroxyethyl methacrylate. The resulting mixture was stirred into a homogeneous aqueous solution, which was then kept warm at 40° C. Then, 12.9 parts of a 10% aqueous solution of ammonium persulfate and 4.0 parts of a 10% aqueous solution of sodium hydrogensulfite were added to initiate the radical polymerization. The internal temperature rose to 65° C. in 30 minutes. The polymerization system was kept warm at 70° C. for further 30 minutes to complete the polymerization, thereby obtaining an aqueous solution (E) of an anionic water-soluble polymer. The aqueous solution (E) had a solid content of 20 wt. %. Its viscosity was 4800 cps at 25° C.

(5-1)

Mixed with stirring were 32.5 parts of the aqueous solution (E) of the polymer and 125.1 parts of water. The pH of the resultant mixture was raised from 2.4 to 4.0 with a 10% aqueous solution of sodium hydroxide, followed by an addition of 130 parts of the same core material as that used in Example 1. The resultant mixture was emulsified at 60° C. for 20 minutes with a Homo-Mixer to obtain an o/w-type emulsion. Its emulsion stability was somewhat insufficient so that when allowed stand as is, its droplet sizes tended to increase due to agglomeration of droplets. Thereafter, 16.25 parts of an 80% aqueous solution of methylated methylolamine (product of Mitsui Toatsu Chemicals, Inc.; "U-Ramin P-6300") were added with stirring to the above emulsion. The contents were subjected to condensation at 60° C. Ten minutes later, the system was gelated in its entirety and no microcapsules were thus obtained therefrom.

(5-2)

Mixed with stirring were 19.88 parts of the aqueous solution (E) of the polymer and 138.33 parts of water. Then, 6.63 parts of urea and 0.93 part of resorcin were added to and dissolved in the resultant mixture. The pH of the thus-prepared mixture was raised from 2.75 to 3.40 with a 10% aqueous solution of sodium hydroxide, followed by an addition of 117 parts of the same core material as that used in Example 1 The resultant mixture was emulsified for 20 minutes at 60° C. with a Homo-Mixer to obtain an o/w-type emulsion. A microscopic observation on the emulsion indicated that its droplets had an average droplet size of about 4 micrometers. Because of strong acidity, the emulsion was tinged in a dark reddish purple color. Then, 17.2 parts of 37% formalin were added with stirring. The reaction was allowed to proceed at 60° C. for 3 hours to complete the microencapsulation. The reaction mixture was then cooled. The resultant microcapsule slurry had a solid content of 45 wt. % and a viscosity of 250 cps.

However, the reddish purple tinge of the slurry was so severe that the tinge did not disappear even when the slurry was rendered alkaline with sodium hydroxide or the like. The surface of each pressure-sensitive paper coated with the thus-obtained microcapsules was tinged so much that the pressure-sensitive paper was not suitable for practical use.

EXAMPLES 6-8 AND COMPARATIVE EXAMPLES 6-9

Added to 69 parts of each of the 20 wt. % aqueous solutions of anionic water-soluble polymers given in Table 1 were 199 parts of deionized water. The pH of the resulting liquid mixture was adjusted to 4.0 with a 10% aqueous solution of sodium hydroxide.

Then, 270 parts of phenylxylylethane containing 3.0 wt. % of Crystal Violet Lactone were added as a core material. The resulting mixture was emulsified for 30 minutes with a Homo-Mixer. After adding 67.5 parts of an 80% aqueous solution of methylated methylolmelamine ("U-Ramin P-6300") to the emulsion, the system was heated to 60° C. so as to condense the contents for 2 hours. Then, the system was cooled to complete the microencapsulation. From each of the anionic polymers, a microcapsule slurry having a solid content of 55 wt. % was obtained.

Results are summarized in Table 1.

EXAMPLE 9

To 69 parts of the 20 wt. % aqueous solution of the anionic water-soluble polymer given in Table 1, were added 175 parts of deionized water. The pH of the resultant liquid mixture was adjusted to 4.3 with a 10% aqueous solution of sodium hydroxide.

Then, 67.5 parts of a 80% aqueous solution of methylated methylolmelamine were added, followed by an addition of 270 parts of a core material which was a composition obtained by mixing, heating and melting 1 part by weight of Crystal Violet Lactone, 2 parts by weight of bisphenol A and 30 parts by weight of lauric acid. The resulting liquid mixture was emulsified for 10 minutes with a Homo-Mixer. Thereafter, the system was heated to 60° C. so as to condense the contents for 2 hours. Then, the system was cooled to complete the microencapsulation.

Results are shown in Table 1.

EXAMPLES 10-11

Microencapsulation experiments were conducted in the same manner as in Example 9 except that the anionic water-soluble polymers given in Table 1 were used and N,N-dimethyl-p-toluidine and the same compounds as that used in Example 1 were used respectively as core materials. Results are tabulated in Table 1.

mixture was lowered to 8° C. while continuing the stirring, thereby gelating the resultant coacervate films After adding 1.75 parts of formalin, the pH of the resultant mixture was raised to 10.5 while adding a 10% aqueous solution of sodium hydroxide little by little. Thus, the coacervate films were hardened to obtain a microcapsule slurry in accordance with the gelatin-carboxymethylcellulose complex coacervation method.

COMPARATIVE EXAMPLE 11

Mixed were 60 parts of phenylxylylethane containing 4.5 wt. % of Crystal Violet Lactone dissolved therein and 30 parts of phenylxylylethane containing 9.78 parts of terephthaloyl chloride dissolved therein. The mix-

TABLE 1

| | Proportions of monomers in employed anionic water-soluble polymer (mole %) | | | | | | | Viscosity of 20% aq. soln. (cps) |
|---|---|---|---|---|---|---|---|---|
| | AC | MAC | AN | AMPS | SEA | SPA | HEA | |
| Example 6 | 45 | — | 40 | 15 | — | — | — | 95 |
| Example 7 | 63 | — | 25 | — | 12 | — | — | 240 |
| Example 8 | 58 | 5 | 30 | — | — | 7 | — | 290 |
| Example 9 | 40 | 10 | 30 | 20 | — | — | — | 270 |
| Example 10 | 40 | — | 40 | 10 | — | 5 | 5 | 1020 |
| Example 11 | 42 | — | 45 | 13 | — | — | — | 450 |
| Comparative Example 6 | 90 | — | — | 10 | — | — | — | 1900 |
| Comparative Example 7 | 60 | — | 40 | — | — | — | — | 2300 |
| Comparative Example 8 | 15 | — | 35 | 50 | — | — | — | Gelated upon polymerization |
| Comparative Example 9 | 20 | — | — | 80 | — | — | — | 1200 |

| | Properties of resultant microcapsules | | | |
|---|---|---|---|---|
| | Slurry | | Av. particle size (μ) | Note |
| | Solid content (%) | Viscosity (cps) | | |
| Example 6 | 55 | 120 | 4.5 | — |
| Example 7 | 55 | 180 | 3.8 | — |
| Example 8 | 55 | 160 | 3.6 | — |
| Example 9 | 58 | 180 | 3.9 | — |
| Example 10 | 58 | 350 | 2.9 | — |
| Example 11 | 66 | 960 | 4.0 | — |
| Comparative Example 6 | 55 | — | — | Poor emulsion stability; Became viscous and gelated after 5 minutes from the initiation of condensation. |
| Comparative Example 7 | 55 | — | — | Good emulsion stability, but became viscous and gelated after initiation of condensation. |
| Comparative Example 8 | — | — | — | — |
| Comparative Example 9 | 55 | — | — | Poor emulsion stability; Gelated upon encapsulation |

Abbreviations:
AC(acrylic acid), MAC(methacrylic acid), AN(acrylonitrile), AMPS(acrylamidopropanesulfonic acid), SEA(sulfoethyl acrylate), SPA(sulfopropyl acrylate), and HEA(hydroxyethyl acrylate).

COMPARATIVE EXAMPLE 10

Twenty parts of acid-treated gelatin were dissolved under heat in 200 parts of water. The pH of the resultant solution was raised to 10.0 with a 10% aqueous solution of sodium hydroxide, to which 100 parts of phenylxylylethane containing 3 wt. % of Crystal Violet Lactone dissolved therein were added. The resulting mixture was stirred and emulsified at high speed at 55° C. with a Homo-Mixer. While continuing the stirring further, 50 parts of a 10% aqueous solution of carboxymethylcellulose (average polymerization degree: 160; etherification degree: 0.70) were added. It was then diluted by an addition of 1030 parts of warm water, and its pH was thereafter adjusted to 4.3 so that coacervation was induced. Then, the temperature of the liquid ture was added to 300 parts of a 2 wt. % aqueous solution of polyvinyl alcohol ("Poval-205"; product of Kuraray Co., Ltd.). The resulting mixture was emulsified with a Homo-Mixer to obtain an o/w-type emulsion having an average droplet size of 4–5 micrometers. Thereafter, a solution containing 5.58 parts of diethylenetriamine and 2.88 parts of sodium carbonate, both, dissolved in 60 parts of water was added dropwise to the emulsion while cooling and stirring the emulsion. The resulting mixture was stirred for 24 hours at room temperature to obtain a slurry of microcapsules having a polyamide wall which was in turn formed by interfacial polycondensation of diethylenetriamine and terephthaloyl chloride.

EXAMPLE 12

Mixed with stirring in 98 parts of water were 40 parts of the 20% aqueous solution of the anionic water-soluble polymer, which solution was obtained in Example 3, and 2.1 parts of a 40% aqueous solution of sodium diethylenetriaminepentaacetate ("Chilest-P"; product of Chilest Kagaku K.K.). Acetic acid was added to the resultant mixture to adjust its pH to 4.1.

Then, 130 parts of dioctyl phthalate containing 2.5 wt. % of 4,4′,4″-tris-dimethylamino-triphenylmethane and 0.7 wt. % of 4,4′-bis-dimethylamino-3′-methyl-4″-ethoxytriphenylmethane, both dissolved in the dioctyl phthalate, were added. The resultant mixture was emulsified with a Homo-Mixer to obtain a stable o/w emulsion having an average particle size of about 4 micrometers. Then, 32.5 parts of a melamine-formaldehyde initial condensation product having a solid content of 20 wt. % ("Sumilex Resin #613"; product of Sumitomo Chemical Co., Ltd.) were added. The resultant mixture was heated at 55° C. for 4 hours to condense the reactants. A 28% aqueous ammonia solution was added to the resulting microcapsule slurry until its pH reached 8.0 to remove remaining formaldehyde, after which 6 parts of triethanolamine were added further to complete the microencapsulation.

The thus-obtained microcapsule slurry had a solid content of 55 wt. % and a viscosity of 180 cps.

With respect to Examples and Comparative Examples directed to microcapsules of core materials for pressure-sensitive copying paper out of the above Examples and Comparative Examples, their evaluation as materials for pressure-sensitive copying paper was carried out in the following manner. Results are summarized in Table 2.

(A) Preparation of pressure-sensitive copying paper:

With every 100 parts by solids of the resultant microcapsules, were thoroughly mixed 50 parts of wheat starch (average particle size: 18 micrometers) and 70 parts of a 20% aqueous solution of phosphated starch (cooked product; "Niehl Gum A-55", product of Abebe Inc.). The pH of the resultant mixture was adjusted to 9.0 with an aqueous solution of sodium hydroxide. The thus-prepared mixture was diluted with water to obtain an aqueous coating formulation having a solid content of 30 wt. %. The aqueous coating formulation was applied onto a base paper web having a basis weight of 50 g/m² to give a dry coat weight of 4.0 g/m². The thus-coated paper web was then dried to obtain CB-sheets for pressure-sensitive copying paper sheets.

(B) Determination of smudging tendency under pressure

The above-prepared CB-sheet was brought into a contiguous relation with a commercial CF-sheet making use of a color-developing agent of the phenol resin type and suitable for use in pressure-sensitive copying paper ("Resin CCP W-50BR"; product of Jujo Paper Co., Ltd.). Both sheets were then pressed for 30 seconds under a pressure of 10 kg/cm² on a steel plate by means of a Muellen bursting strength tester. The extent of coloration of the coated surface of the CF-sheet was measured in terms of reflectivity both before and after the above test by means of a Hunter colorimeter (equipped with an amber filter). The smaller the difference between the reflectivity before the test and that after the test, the better the resistance to mild static pressures (for example, stacked sheets' own weight).

(C) Denseness of films

The CB-sheet prepared in the above test (A) was allowed to stand for 20 hours in an oven which was maintained at 105° C. The thus-heated CB-sheet was brought into a contiguous relation with the above-mentioned CF-sheet ("W-50BR", product of Jujo Paper Co., Ltd.). Both sheets were then typed at a constant typewriter intensity by an electric typewriter ("Hermes Model-808") to produce a color mark. One hour later, the intensity of the color mark was measured in terms of reflectivity by a Hunter colorimeter (equipped with an amber filter). Besides, its corresponding CB-sheet which had not been heated in the oven was also brought into a contiguous relation with the aforementioned CF-sheet. They were typed by the electric typewriter to produce a color mark. The color mark was also measured in terms of reflectivity. A smaller difference between the color intensity of the oven-treated CB-sheet and that of the oven-untreated CB-sheet indicates better denseness of microcapsule films and hence smaller tendency of release of contents even when stored at elevated temperatures.

(D) Water-proofness

Ten parts of the microcapsule slurry of each of the Examples and Comparative Examples were mixed with 50 parts of a dispersion obtaining by diluting a 40% dispersion of p-phenylphenol resin ("RBE-40", product of Mitsui-Toatsu Chemicals, Inc.; already put to practical use as a color-developing agent for pressure-sensitive copying paper) with water in an amount twice the amount of the 40% dispersion. The extent of tinge of the resulting liquid mixture was visually judged one hour later. Microcapsules having poor water-proofness produced their colors when brought into contact with the color-developing agent in the liquid mixtures. Use of such poor microcapsules will be limited considerably when self-contained pressure-sensitive copying paper sheets, in which microcapsules and a color-developing agent are coated in a superposed or mixed fashion on the same surface of a base, are to be produced.

TABLE 2

| Microcapsules | Properties of microcapsules | | | Properties of CB-sheet | | Remarks |
| --- | --- | --- | --- | --- | --- | --- |
| | Solid content (wt. %) | Viscosity (cps) | Water proofness | Smudging tendency under pressures | Film denseness | |
| Ex. 1 | 63 | 320 | ⊙ | — | .1.4 | — |
| Ex. 2 | 60 | 100 | ⊙ | — | 1.3 | — |
| Ex. 2 | 50 (diluted) | 23 | ⊙ | — | — | — |
| Ex. 3 | 60 | 90 | ⊙ | — | 0.9 | — |
| Ex. 4 | 53 | 50 | ⊙ | — | 0.7 | — |
| Ex. 5 | 55 | 75 | ⊙ | — | 1.2 | — |
| Ex. 6 | 55 | 120 | ⊙ | — | 1.4 | — |
| Ex. 7 | 55 | 180 | ⊙ | — | 0.9 | — |
| Ex. 8 | 55 | 160 | ⊙ | — | 0.9 | — |
| Ex. 11 | 66 | 960 | ⊙ | — | 0.8 | — |

TABLE 2-continued

| Microcapsules | Properties of microcapsules | | | Properties of CB-sheet | | Remarks |
| --- | --- | --- | --- | --- | --- | --- |
| | Solid content (wt. %) | Viscosity (cps) | Water proofness | Smudging tendency under pressures | Film denseness | |
| Comp. Ex. 1 | 43.9 | 7200 | ○ | 3.8 | 5.3 | Became viscous upon microcapsule formlation. High viscosity. |
| Comp. Ex. 2 | 35 | 250 | ○ | 3.6 | 5.4 | Heavy pH dependency of viscosity. Became viscous at the alkaline side. |
| Comp. Ex. 3 | 50 | 620 | ⊚ | 4.5 | 2.7 | Difficult formaldehyde removal. at the acidic side. |
| Comp. Ex. 4-1 | 50 | Gelated | — | — | — | Became viscous and gelated upon encapsulation. |
| Comp. Ex. 4-2 | 50 | 350 | ○ | 16.5 | 3.5 | Poor emulsion stability. Irregular particle sizes. |
| Eomp. Ex. 5-1 | 49 | Gelated | — | — | — | Became viscous and gelated upon encapsulation. |
| Comp. Ex. 5-2 | 45 | 250 | ○ | 8.5 | 2.5 | Films made of urea-formaldehyde resin. Microcapsules were tinged severely. |
| Comp. Ex. 6 | 55 | Gelated | — | — | — | Gelated upon microencapsulation. |
| Comp. Ex. 7 | 55 | Gelated | — | — | — | Gelated upon microencapsulation. |
| Comp. Ex. 8 | — | — | — | — | — | Gelated upon preparation of anionic polymer. Failed to encapsulate. |
| Comp. Ex. 10 | 16 | 40 | X | 3.1 | 2.8 | Encapsulted by the gelatin complex coacervation method. Low solid content. |
| Comp. Ex. 11 | 30 | 210 | X | 4.2 | 10.5 | Polyamide formed by the interfacial polymerization process. Poor water proofness and low film denseness. |

Note:
Water proofness
⊚ Excellent
○ Good
X Poor

EXAMPLE 13

Thoroughly mixed were 50 parts of an anionic water-soluble polymer (a 20 wt. % aqueous solution; viscosity: 300 cps) having a monomer composition of 55 mole % acrylic acid, 40 mole % acrylonitrile and 5 mole % of 2-acrylamido-2-methylpropanesulfonic acid and obtained by radical-polymerizing the monomers in an aqueous system, 10 parts of urea, 1 part of resorcin and 250 parts of water. The pH of the resultant mixture was adjusted to 3.3 with a 20% aqueous NaOH solution. Then, as core materials, 200 parts of phenylxylylethane ("Hisol SAS-296", product of Nippon Petrochemical Co., Ltd.) containing 3 wt. % of Crystal Violet Lactone and 0.8 wt. % of Benzoyl Leuco Methylene Blue, both dissolved in the phenylxylylethane, were added. The resultant mixture was emulsified using a Homo-Mixerat 9,000 rpm. Three minutes later, there was obtained a stable o/w-type emulsion having an average droplet size of 4.0 micrometers. Twenty-five parts of formalin (a 37% aqueous solution of formaldehyde) were then added to the above system. The system was heated to 60° C. with stirring. While continuing the stirring, the system was held at this temperature for 4 hours to provide microcapsules having dense wall films, which were made of a urea-formaldehyde resin, around the core material. The system was then cooled, and a 28% aqueous ammonia solution was added little by little with stirring to raise the pH of the system to 8.5. Thus, the smell of formaldehyde was completely wiped off from the system. The thus-obtained microcapsule slurry had a solid content of 43 wt. % and a low viscosity of 85 cps. No substantial viscosity changes were observed on the slurry over a pH range of from pH 3.3 (at the time of condensation) to pH 8.5 (after removal of formaldehyde).

EXAMPLE 14

After mixing 25 parts of a 20 wt. % aqueous solution (pH: 2.8; viscosity: 130 cps) of a radical copolymer having a monomer composition of 40 mole % of acrylic acid, 20 mole % of methacrylic acid, 25 mole % of acrylonitrile and 15 mole % of sulfopropyl acrylate, 0.5 part of resorcin and 84.4 parts of water into a uniform solution, 21.05 parts of an aqueous solution of methylated methylolurea having a non-volatile content of 47.5% ("T-105", product of Mitsui-Toatsu Chemicals, Inc.) were mixed to form a solution. The pH of the solution was 3.5. One hundred parts of the same core material as that used in Example 13 were added and the resulting mixture was emulsified with a Homo-Mixer into a stable o/w-type emulsion having an average droplet size of 3.4 micrometers. While stirring the emulsion, its temperature was raised to 55° C. at which the emulsion was maintained for 10 hours so as to complete the formation of microcapsules equipped with wall films made of a urea-formaldehyde resin. The thus-obtained microcapsule slurry had a solid content of 50 wt. % and a viscosity of 250 cps (at 25° C.)

EXAMPLE 15

Mixed with and dissolved in 50 parts of a 20% aqueous solution (pH 2.4; viscosity: 700 cps at 25° C.) of an anionic water-soluble polymer obtained by radical-polymerizing acrylic acid, acrylonitrile, 2-acrylamido-2-methylpropanesulfonic acid and hydroxyethyl acrylate at respective proportions of 45 mole %, 40 mole %, 10 mole % and 5 mole %, were 105.2 parts of water, 2.0 parts of resorcin and 60 parts of an aqueous solution ("T-LG", product of Mitsui-Toatsu Chemicals, Inc.) having a non-volatile content of 50% and containing methylolurea. A homogeneous aqueous solution of pH 3.3 was thus prepared, to which were added, as a core material, 200 parts of isopropyldiphenyl containing 4.5 wt. % of 3-diethylamino-6-methyl-7-anilinofluoran and 0.5 part of Crystal Violet Lactone, both dissolved in the isopropyldiphenyl. The resultant mixture was emulsified in a Waring blender to obtain a stable o/w-type emulsion having an average droplet size of 4.5 micrometers. The system was heated with stirring to 55° C., at which it was held for 5 hours to complete the microencapsulation.

The thus-obtained microcapsule slurry had a solid content of 58 wt. % and a viscosity of 320 cps (at 25° C.).

COMPARATIVE EXAMPLE 12

Twenty parts of white powder of an ethylene-maleic anhydride ("EMA-31", product of Monsanto) were suspended in 180 parts of water. The resultant suspension was heated with stirring to 95° C. The white powder was completely dissolved one hour later, thereby providing a 10% aqueous viscous solution of a hydrolysate of the ethylene-maleic anhydride copolymer.

Then, 100 parts of the 10% aqueous solution, 10 parts of urea, 1 part of resorcin and 200 parts of water were mixed together. The pH of the mixture was adjusted to 3.5 with a 20% aqueous NaOH solution, to which 200 parts of the same core material as that used in Example 13 were added. Using a Homo-Mixer (at 9,000 rpm), the resulting mixture was converted into a stable o/w-type emulsion having an average droplet size of 4.0 micrometers.

The emulsification took 7 minutes which was as much as twice the time spent in Example 13. Formalin (a 37% aqueous solution of formaldehyde) was added to the system. The system was heated with stirring to 60° C., and while continuing the stirring, the system was kept at the same temperature for 4 hours so as to form microcapsules having dense wall films, made of a urea-formaldehyde resin, around the core material. After cooling the system, a 28% aqueous ammonia solution was added slowly with stirring to adjust its pH to 8.5, thereby wiping off the smell of formaldehyde from the system.

The thus-obtained microcapsule slurry had a solid content of 43 wt. %, which was the same as that achieved in Example 13, but a viscosity of 230 cps. This microcapsule slurry showed the tendency of viscosity increment in the removal step of formaldehyde with an aqueous ammonia solution.

As apparent from the above Examples and Comparative Examples, microcapsules and microcapsule slurries which are both obtained in the process of this invention have the following advantages from the viewpoints of both production process and properties:

(1) Extremely high concentration and low viscosity;
(2) Excellent water-proofness;
(3) Excellent and dense films;
(4) Easy control of particle sizes owing to good emulsion stability;
(5) Stable viscosity and emulsion stability over a wide ph range of from the alkaline side to the acidic side, whereby permitting application of various formaldehyde-removing methods; and
(6) Extremely simple microencapsulation step compared with conventional processes.

Judging from the industrial viewpoint, the present invention has brought about such great advantages that:

(1) significant reduction has been materialized in both production cost and shipping cost; and
(2) when applied to pressure-sensitive copying paper, each coating formulation of resulting microcapsules can be applied at a high concentration and a significant cost merit can be brought about owing to an improvement to the efficiency of the coating work (i.e., an increased coating speed) and a considerable reduction to the cost of coating energy.

We claim:

1. A reaction system modifier suitable for use in the production of microcapsules, comprising an aqueous solution of a multicomponent water-soluble copolymer containing as essential components thereof at least three types of acrylic monomers selected, respectively, from (A) acrylic acid, (B) acrylonitrile and (C) an acrylamidoalkylsulfonic acid having the formula:

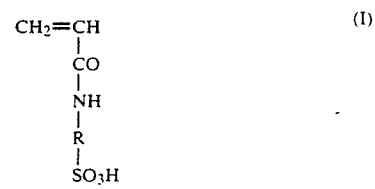

wherein R means an alkylene group having 1 to 4 carbon atoms, the proportions of said three types of monomers being from 20 to 70 mole percent of monomer (A), from 20 to 70 mole percent of monomer (B) and from 0.5 to 30 mole percent of monomer (C), respectively.

2. The reaction system modifier according to claim 1 wherein, when the aqueous solution contains 20 weight percent of non-volatile components, the aqueous solution has a viscosity of 3 to 100,000 cps at a pH of 4.0 and 25° C.

3. The reaction system modifier according to claim 1 wherein the weight percent of the non-volatile components, in the aqueous solution is in the range from 5.1 to 20.

* * * * *